United States Patent [19]
Von Blücher et al.

[11] Patent Number: 5,977,016
[45] Date of Patent: Nov. 2, 1999

[54] PROCESS FOR PRODUCING GRANULATED ACTIVATED CARBON

[75] Inventors: Hasso Von Blücher, Erkrath; Ernest De Ruiter, Leverkusen, both of Germany

[73] Assignee: MHB Filtration GmbH & Co. KG, Erkrath, Germany

[21] Appl. No.: 08/880,750

[22] Filed: Jun. 23, 1997

[30] Foreign Application Priority Data

Jun. 22, 1996 [DE] Germany .............................. 196 25 069

[51] Int. Cl.$^6$ ........................................................ B01J 20/02
[52] U.S. Cl. .......................... 502/426; 502/434; 502/418; 423/445 R
[58] Field of Search ......................... 423/445 R; 502/426, 502/434, 437, 418

[56] References Cited

U.S. PATENT DOCUMENTS

| | | | |
|---|---|---|---|
| 4,024,290 | 5/1977 | Layton | 426/548 |
| 4,040,990 | 8/1977 | Neely | 528/481 |
| 4,265,768 | 5/1981 | Beasley et al. | 210/682 |
| 4,582,939 | 4/1986 | Perozzi et al. | 568/72 |
| 5,166,123 | 11/1992 | Agvi et al. | 502/416 |

*Primary Examiner*—Steven Bos
*Assistant Examiner*—Stuart L. Hendrickson
*Attorney, Agent, or Firm*—Evenson, McKeown, Edwards & Lenahan, P.L.L.C.

[57] ABSTRACT

Granulated activated carbon is produced by an improved process which involves carbonizing pellets of a styrene-divinyl benzene copolymer matrix with concentrated sulfuric acid at temperatures up to at least 750° C., followed by activation at temperatures of 800° C. to 900° C.

13 Claims, No Drawings

PROCESS FOR PRODUCING GRANULATED ACTIVATED CARBON

BACKGROUND OF THE INVENTION

1. Field of the Invention

The present invention relates to a process for producing granulated active carbon by carbonizing pellets of a styrene-divinyl benzene copolymer matrix with concentrated sulfuric acid at elevated temperatures.

2. Description of the Related Art

German Patent Application 196 00 237 describes a process for converting ion exchangers or their prestages, i.e., polymer pellets without functional groups, into high-value adsorbents on a carbon basis. Polymer pellets based on styrene and some divinyl benzene are especially suitable.

The process disclosed in German Patent Application 196 00 237 is as follows: Sulfuric acid is added at the beginning of the carbonization process. This prevents the polymer pellets from baking together and bursting, and results in a clear increase in yield. The sulfuric acid leads to sulfonization of the aromatic rings with formation of sulfonic ($-SO_3H$) groups and their decomposition with subsequent interlacing via radicals and sulfur bridges. The starting material can be in macroporous or gel-type form.

Because water is formed during sulfonization in accordance with the equation $$H + HOSO_2OH \rightarrow SO_2OH + H_2O$$

and this water would slow the reaction, it is important to continually remove the formed water. This can be done by means of a nitrogen flow, for example.

Complete sulfonization is important for various reasons. Incomplete sulfonization of the polymer pellets leads to inadequate interlacing, especially in the interior of the pellets, so that monomers could easily split off and gas outbreaks could occur, causing the outer shell of the pellets to burst.

Although bursting can be prevented by special temperature programs, products with low vibration density are nonetheless obtained, because complete carbonization and activation result in pellets that are very open-pored in the interior. Vibration weight is very important when a certain mass is to be located in a small space. For this reason, "light" pellets, i.e., products with low vibration density, are less in demand.

Complete sulfonization can be achieved using the process described in German Patent Application 196 00 237, especially when the upper limit of the stated range for the sulfuric acid quantity is approached. However, attention must be paid to many process parameters. For example, there must be a careful and relatively long temperature program as well as exactly dosed nitrogen rinsing, because it is only the moisture, not the sulfuric acid, that is to be removed. Furthermore, not all starting materials behave the same way. For example, anion exchangers can be sulfonized easily using this process, whereas prestages are much more difficult to sulfonize, regardless of whether they exist in macroporous or gel-type form.

OBJECTS AND SUMMARY OF THE INVENTION

Therefore, the object of the present invention is to provide a process that permits the production of granulated active carbon with high vibration density under easily manipulatable process conditions at relatively low expense and regardless of the nature of the starting materials.

The present invention is thus directed to an improved process for producing granulated active carbon comprising carbonizing pellets of a styrene-divinyl benzene copolymer matrix with concentrated sulfuric acid at temperatures up to at least 750° C., preferably up to 900° C., and then activating the pyrolysis (carbonized) product at temperatures of 800° C. to 900° C., wherein concentrated, approximately 96% sulfuric acid is used in a quantity of at least 50% by weight, relative to the dry substance of the matrix, corresponding to 39% by weight sulfur trioxide ($SO_3$).

In the process according to the present invention, the sulfuric acid is used, preferably, in quantities of 39% by weight to 83% by weight, calculated as $SO_3$ and relative to the dry substance of the matrix.

The applicant has found that by adding oleum to the sulfuric acid, surprisingly high yields of spherical carbon can be attained. Bursting of the pellets is thereby avoided, and products with a very high vibration density are obtained.

The concentrated sulfuric acid used can be completely or partially replaced by oleum. Preferably, the sulfuric acid is added as a mixture of sulfuric acid and oleum in the ratio of 3:1 to 1:1. The individual components of the mixture, i.e., the sulfuric acid and the oleum, can be added together (i.e., in already premixed form) or separately, consecutively or simultaneously, to the matrix to be treated. Preferably, oleum with an $SO_3$ content of 20% to 30% is used. However, oleum with a higher $SO_3$ content can also be used for purposes according to the invention.

The use of oleum offers the advantage that low residual water quantities, e.g., trace water in the matrix, are immediately bound by the free sulfur trioxide in the oleum, with formation of sulfuric acid.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

The first process step, carbonization, is carried out at temperatures up to approximately 700° C. The carbonization process can be carried out in a revolving tubular kiln, for example.

The subsequent process step, activation, is carried out, in particular, at temperatures from 700° C. to 900° C. In general, activation is carried out with an oxidizing or activating gas, e.g., atmospheric oxygen, $CO_2$ and/or steam. Activation can be carried out, for example, in a revolving tubular kiln or a moving bed.

In a special embodiment of the process according to the invention, carbonization and activation are carried out in one step. Starting at 700° C. to 800° C., an oxidizing gas is added to the initially inert atmosphere. Carbonization can thereby be carried out in a non-inert, oxygen-containing atmosphere. As a result, the pseudo-graphitization of the matrix pellets is prevented and activity is increased further. Particularly in the case of gel-type starting materials, the activation process is made easier by carbonization in a slightly oxidative atmosphere.

Preferably, a styrene-divinyl benzene copolymer matrix in a water-free or almost water-free form is used as the starting material. For example, prestages of anion or cation exchangers can be used as starting materials. These can exist as macroporous polymers or polymers of the gel type, for example. The styrene-divinyl benzene copolymer matrix can also be used in the form of anion exchangers, for example, which can be dried as needed before the treatment with sulfuric acid.

The present invention will be illustrated by the following example which is for illustrative purposes only; it is riot to be construed as limiting the scope of the present invention which is properly deineated only in the appended claims.

EXAMPLE 1 kg starting material for a cation exchanger of the gel type with a divinyl content of approximately 4% was moistened with 500 g concentrated sulfuric acid and placed in a revolving tubular kiln from the Plec Company. Then 500 g oleum was added and the furnace was sealed. During the total heating period to 400° C., the kiln was rinsed with a nitrogen flow of 0.5 l/min. At this point in time, the yield of carbonized material was 80%. Then carbonization was continued to 875° C., whereby a further weight loss of 8% occurred. Next, activation was carried out with 75% by volume nitrogen and 25% by volume steam at 875° C. for 90 minutes. 502 g spherical carbon with a vibration density of 0.74 g/cm$^3$ and a specific surface of 1180 cm$^2$/g (BET) was obtained.

The invention is riot limited by the embodiments described above which are presented as examples only but can be modified in various ways within the scope of protection defined by the appended patent claims.

We claim:

1. A process for producing granulated activated carbon, comprising:

(a) carbonizing pellets of styrene-divinyl benzene copolymer matrix with concentrated sulfuric acid at a temperature of at least 750° C. wherein the sulfuric acid is used in a quantity of 39% by weight to 83% by weight, calculated as SO$_3$ and relative to the dry substance of the matrix; and (b) activating the carbonized product at a temperature of 800° C. to 900° C.

2. The process of claim 1, wherein the sulfuric acid is replaced partially by oleum.

3. The process of claim 1, wherein the carbonization and activation are carried out in one step.

4. The process of claim 3, wherein the carbonization and activation are carried out in one step in an inert atmosphere.

5. The process of claim 4, further comprising, prior to carbonization, the addition of an oxidizing gas to the inert atmosphere starting at 750° C. to 800° C.

6. The process of claim 3, wherein carbonization and activation are carried out under an oxygen-containing atmosphere.

7. The process of claim 1, wherein the carbonization is carried out at a temperature of about 900° C.

8. A process for producing granulated activated carbon, comprising:

(a) carbonizing pellets of styrene-divinyl benzene copolymer matrix with oleum at a temperature of at least 750° C. wherein the oleum is used in a quantity of 39% by weight to 83% by weight, calculated as SO$_3$ and relative to the dry substance of the matrix; and (b) activating the carbonized product at a temperature of 800° C. to 900° C.

9. The process of claim 8 wherein the carbonization and activation are carried out in one step.

10. The process of claim 9 wherein the carbonization and activation are carried out in one step in an inert atmosphere.

11. The process of claim 9 further comprising, prior to carbonization, the addition of an oxidizing gas to the inert atmosphere starting at 750° C. to 800° C.

12. The process of claim 9, wherein carbonization and activation are carried out under an oxygen-containing atmosphere.

13. The process of claim 8 wherein the carbonization is carried out at a temperature of about 900° C.

* * * * *